3,551,416
PIPERIDEIDES
Hermann Oediger, Cologne-Stammheim, and Anton Oberdorf, Wuppertal-Elberfeld, Germany, assignors to Farbenfabriken Bayer Aktiengesellschaft, Leverkusen, Germany, a corporation of Germany
No Drawing. Filed June 29, 1967, Ser. No. 649,863
Claims priority, application Germany, Aug. 5, 1966, F 49,877
Int. Cl. C07d 29/38
U.S. Cl. 260—240         17 Claims

ABSTRACT OF THE DISCLOSURE

New acid piperideides useful as choleretics are provided from certain piperideines such as 4-methyl- or 3,4-dimethyl-$\Delta^3$-piperideines by reaction with certain aromatic acid halides such as phenylacetic acid halides and their acetoxy, acetamino, alkoxy and other analogs and their hydroxy products of hydrolysis.

---

The present invention relates to new acid piperideides useful as orally administrable choleretics and having the formula:

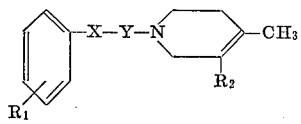

(I)

wherein:
X is a direct bond, a —CH$_2$—, —CH=CH—, —CH$_2$—CH$_2$—, or

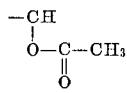

group,
Y is —CO— or SO$_2$—,
R$_1$ is hydrogen, one or more unsubstituted hydroxyl groups, one or more acetylated hydroxyl groups, one or more alkylated hydroxyl groups, unsubstituted amino or acetylated amino, and
R$_2$ is hydrogen or methyl.

The new compounds of the invention exhibit a strong choleretic activity and are superior in general to known choleretics with regard to the extent and duration of their effect. The compounds generally exhibit a surprisingly low acute toxicity when administered orally in the manner and amounts of known choleretics.

The new acid piperideides are obtained by reacting an acid halide of the formula:

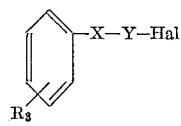

in which:

Hal is a halogen atom,
X is a direct bond or a —CH$_2$— group, a —CH=CH— group, a —CH$_2$—CH$_2$— group, a —CHOH— group or a

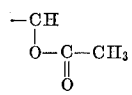

group,
Y is a —CO— group or a SO$_2$ group and R$_3$ is hydrogen or one or more low molecular alkoxy groups, acetoxy groups or acetylamino groups, with a piperideine of the formula:

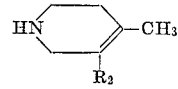

in which R$_2$ is hydrogen or a methyl group, in a solvent and in the presence of a hydrogen halide acceptor, hydrolyzing the group R$_3$, if desired, and isolating from the reaction mixture compounds of the formula:

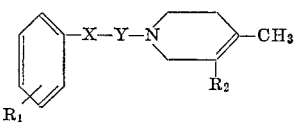

(I)

in which X, Y and R$_2$ have the same meaning as above and R$_1$ is hydrogen or one or more hydroxyl groups which may acetylated or alkylated, or amino groups which may be acetylated.

Suitable acid halides are aromatic or mixed aromatic aliphatic carboxylic acid or sulphonic acid chlorides or bromides for example, phenylacetic acid bromide, o-acetoxy-phenylacetic acid chloride, p-acetoxy-phenylacetic acid chloride, p-acetaminophenylacetic acid chloride, 2,5-dimethoxy-phenylacetic acid chloride, o-acetyl-mandelic acid chloride, 2,5-diacetoxy-benzoyl chloride, 2-acetoxy-benzoyl chloride, benzene-sulphonic acid chloride, dihydro-cinnamic acid chloride, benzyl-sulphonic acid chloride, 3,4-dimethoxy-cinnamic acid chloride, p-acetamino-benzene-sulphochloride, etc.

Suitable piperideines are 4-methyl-$\Delta^3$-piperideine and 3,4-dimethyl-$\Delta^3$-piperideine.

Suitable hydrogen halide acceptors are tertiary bases such as pyridine, collidine, dimethylaniline or triethylamine; or also inorganic alkaline solutions, such as aqueous sodium or potassium hydroxide solutions. The piperideines themselves can also be used as hydrogen halide acceptors.

As solvents there may be used those solvents which are inert to the reaction components, for example, hydrocarbons such as cyclohexane, benzene or toluene; ethers such as diethyl ether or tetrahydrofuran; polar solvents such as acetonitrile, chloroform or methylene chloride. The tertiary bases, for example, pyridine, can also be used as solvents.

It is expedient to react one mole of acid halide with 1.0 to 1.2 moles of the hydrogen halide acceptor. If the piperideine is to act as hydrogen halide acceptor, 2.0 moles thereof are required. A larger excess of piperideine or of the hydrogen halide eliminator is not detrimental. It is expedient if these compounds are to act as solvents.

The temperature to be applied for the reaction depends on the reactivity of the acid halides and ranges between —20° and +100° C., preferably between 0° and 80° C. The reaction time ranges from 30 minutes to 2 hours, dependent upon the reaction components.

The hydrolysis of the O-acetylated or N-acetylated products of the present process, which may follow, can be carried out in known manner with aqueous or alcoholic alkaline solutions, such as NaOH or KOH solutions. In the case of O-acetylated products room temperature will suffice for this purpose.

The invention is illustrated by the following non-limitative examples.

EXAMPLE 1

A solution of 30.9 parts by weight of phenylacetic acid chloride in 50 parts by volume of anhydrous ether and 25 parts by volume of methylene chloride is poured at 0° C. into a mixture of 19.4 parts by weight of 4-methyl-$\Delta^3$-piperideine, 20.2 parts by weight of triethylamine and 200 parts by volume of anhydrous ether, the reaction mixture is subsequently stirred at room temperature for 30 minutes, heated under reflux for 2 hours and allowed to cool. The precipitate is filtered off with suction and washed with ether, the resultant solution is concentrated by evaporation in a vacuum, the concentrate is distilled in a high vacuum. Boiling point 146–150° C./0.002 mm. Hg; $n_D^{20}$=1.5546. Yield: 30.8 parts by weight of phenylacetic acid-(4-methyl-$\Delta^3$-piperideide).

EXAMPLE 2

The procedure is as described in Example 1, but the phenylacetic acid chloride is replaced with 2,5-dimethoxyphenylacetic acid chloride. There are obtained 54 parts by weight of 4-methyl-$\Delta^3$-piperideide which is purified through neutral aluminum oxide (activity stage II) in ether. Yield: 47 parts by weight of 2,4-dimethoxy-phenylacetic acid-(4-methyl-$\Delta^3$-piperideide).

EXAMPLE 3

The procedure is as described in Example 1, but O-acetylmandelic acid chloride is used as the acid chloride.

The reaction product is partially hydrolyzed at 0° C. with 120 parts by volume of an ethanolic 2 N sodium hydroxide solution by allowing it to stand for 12 hours. The solvent is removed in a vacuum, the residue taken up with ether, the ethereal solution is washed with water until neutral, dried over $Na_2SO_4$ and concentrated by evaporation. There are thus obtained 34 parts by weight of mandelic acid-(4-methyl-$\Delta^3$-piperideide) which are recrystallized from ether; M.P. 77–79° C.

EXAMPLE 4

A mixture of 51.2 parts by weight of 2,5-diacetoxy-benzoyl chloride and 200 parts by volume of benzene is poured at +5° C. into a solution of 20.0 parts by weight of 4-methyl-$\Delta^3$-piperideine and 17.6 parts by weight of pyridine in 200 parts by volume of benzene, the reaction mixture is subsequently heated under reflux for one hour, cooled, the precipitated pyridine hydrochloride is removed and the solution concentrated by evaporation. In this way there are obtained 53 parts by weight 2,5-diacetoxy-benzoic acid-(4-methyl-$\Delta^3$-piperidiede). These are dissolved in 100 parts by volume of ethanol and partially hydrolyzed by allowing them to stand with 240 parts by volume of 2 N NaOH for a period of time of 30 minutes. The alcoholic solution is acidified with 2 N hydrochloric acid, extracted with ether, the ethereal solution is briefly dried with $Na_2SO_4$ and filtered. The 2,5-dihydroxy-benzoic acid-(4-methyl-$\Delta^3$-piperideide) crystallizes from the ethereal solution after a short time; M.P. 195–198° C.

EXAMPLE 5

The procedure is as described in Example 4, but 39.7 parts by weight of 2-acetoxy-benzoyl chloride are used as the acid chloride. In this way there are obtained 42 parts by weight of 2-acetoxy-benzoic acid-(4-methyl-$\Delta^3$-piperideide) which are hydrolyzed as described in Example 4; M.P. 100–102° C.

EXAMPLE 6

A mixture of 22 parts by weight of 4-methyl-$\Delta^3$-piperideine, 50 parts by weight of triethylamine, 100 parts by volume of dimethylformamide, 35.2 parts by weight of benzene-sulphochloride and 50 parts by volume of benzene is stirred at 90° C. for 2 hours. The reaction mixture is allowed to cool, the triethylamine hydrochloride is filtered off with suction, the solution concentrated by evaporation in a vacuum, the residue taken up with ether, the ethereal solution is washed with water, briefly dried over $Na_2SO_4$ and concentrated by evaporation. There are thus obtained 40 parts by weight of benzene-sulphonic acid-(4-methyl-$\Delta^3$-piperideide) which can be purified by recrystallization from ethanol; M.P. 80–81° C., yield 70% of theory.

EXAMPLE 7

A solution of 33.6 parts by weight of dihydro-cinnamic acid chloride in 50 parts by volume of benzene is poured at about 10% C. into a solution of 22 parts by weight of 4-methyl-$\Delta^3$-piperideine and 30 parts by weight of pyridine in 200 parts by volume of benzene, the reaction mixture is heated under reflux for 2 hours, allowed to cool, the pyridine hydrochloride is removed and the solution concentrated by evaporation. The residue is distilled in a high vacuum. Boiling point 145–150° C./0.001–0.005 mm. Hg; $n_D^{20}$=1.5495. Yield: 39.6 parts by weight (86%) of dihydro-cinnamic acid-(4-methyl-$\Delta^3$-piperideide).

EXAMPLE 8

A mixture of 22 parts by weight of 4-methyl-$\Delta^3$-piperideine, 30 parts by weight of pyridine, 150 parts by volume of dimethyl-formamide and 38 parts by weight of benzylsulphonic acid chloride is stirred at 80° C. for 2 hours. The reaction mixture is allowed to cool, the solvent removed in a vacuum, the residue divided between water and a mixture of ether and benzene, the organic phase is dried and concentrated by evaporation.

In this way there are obtained 35 parts by weight of benzyl - sulphonic acid-(4-methyl-$\Delta^3$-piperideide) which are purified by recrystallization from alcohol; M.P. 116–117° C.

EXAMPLE 9

27 parts by weight of 3,4-dimethoxy-cinnamic acid chloride are introduced at about 10° C. into a mixture of 13.1 parts by weight of 4-methyl-$\Delta^3$-piperideine, 18 parts by weight of pyridine and 150 parts by volume of benzene, the reaction mixture is subsequently heated under reflux for 2 hours, cooled, the pyridine hydrochloride is removed and the solution is concentrated by evaporation. The residue is dissolved in a mixture of benzene and ether and the water-soluble components are removed by shaking with water. After drying the solution and removing the solvent there is obtained a reaction product which solidifies when triturated with ether. Yield: 26 parts by weight of 3,4 - dimethoxy-cinnamic acid-(4-methyl-$\Delta^3$-piperideide); M.P. 113–115° C.

EXAMPLE 10

To a mixture of 18.1 parts by weight of 4-methyl-$\Delta^3$-piperideine, 15 parts by weight of pyridine and 100 parts by volume of benzene are added at about 10° C. a solution of 40 parts by weight of p-acetoxy-phenylacetic acid chloride in 50 parts by volume of benzene, reflux under heating is carried out for one hour followed by cooling and then pyridine hydrochloride is removed from the reaction mixture and the solution concentrated in vacuum. The residue is dissolved in chloroform and freed from water-soluble components by shaking with water. After drying of the solution and after removal of the solvent the obtained p-acetoxy-phenylacetic acid-(4-methyl-$\Delta^3$-piperideine) is stirred for one hour at about 20° C. with 250 parts by volume of 2 N sodium hydroxide in the presence of 30 parts by volume of ethanol. The solution is acidified with 2 N hydrochloric acid under cooling and the resulting precipitate is extracted with chloroform, the organic phase washed with water and dried over sodium sulphate. By concentrating the solution there is obtained therefrom p - hydroxy-phenylacetic acid - (4-methyl-$\Delta^3$-piperideide) which is dissolved and recrystallized from acetone. Yield: 28 parts by weight, M.P. 144–146° C.

EXAMPLE 11

The procedure described in Example 10 is followed except that the p-acetoxy-phenylacetic acid chloride is replaced by m-acetoxy-phenylacetic acid chloride, the obtained m-hydroxy-phenylacetic acid-(4-methyl-Δ³-piperideide) is purified by chromatography on aluminum oxide (activity stage II) in acetone and subsequently dissolved and recrystallized from 50% aqueous ethanol. Yield: 25 parts by weight, M.P. 102–104° C.

EXAMPLE 12

To a mixture of 19.2 parts by weight of 4-methyl-Δ³-piperideine, 20.2 parts by weight of triethylamine and 150 parts by volume of benzene there is introduced at about 10° C. a solution of 37 parts by weight of o-methoxy-phenylacetic acid chloride in 50 parts by volume of benzene, stirring follows for one hour at 80° C., suction filtered from triethylamine hydrochloride and the solvent removed under vacuum. The residue is taken up in ether and freed from water-soluble components with water. There is obtained after evaporation of the solvent and chromatographic purification of the residue on aluminum oxide (activity stage II) in acetone 46 parts by weight of o-methoxy-phenylacetic acid-(4-methyl-Δ³-piperideide).

EXAMPLE 13

The procedure in Example 12 is followed, except that the acid chloride is replaced by p-methoxy-phenylacetic acid chloride and there is obtained 45 parts by weight of p-methoxy-phenylacetic acid-(4-methyl-Δ³-piperideide).

What is claimed is:

1. A compound of the formula:

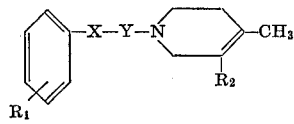

wherein
X is a direct bond, a —CH₂—, —CH=CH—,
—CH₂—CH₂—
—CHOH— or

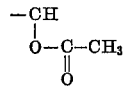

group,
Y is —CO— or SO₂—,
R₁ is hydrogen or one or two unsubstituted hydroxyl, acetylated hydroxyl, low molecular weight alkylated hydroxyl, unsubstituted amino or acetylated amino groups, and
R₂ is hydrogen or methyl.

2. The compound of claim 1 which is phenylacetic acid-(4-methyl-Δ³-piperideide).

3. The compound of claim 1 which is 2,4-dimethoxy-phenylacetic acid-(4-methyl-Δ³-piperideide).

4. The compound of claim 1 which is mandelic acid-(4-methyl-Δ³-piperideide).

5. The compound of claim 1 which is 2,5-diacetoxy-benzoic acid-(4-methyl-Δ³-piperideide).

6. The compound of claim 1 which is 2,5-dihydroxy-benzoic acid-(4-methyl-Δ³-piperideide).

7. The compound of claim 1 which is 2-acetoxy-benzoic acid-(4-methyl-Δ³-piperideide).

8. The compound of claim 1 which is benzene-sulphonic acid-(4-methyl-Δ³-piperideide).

9. The compound of claim 1 which is dihydro-cinnamic acid-(4-methyl-Δ³-piperideide).

10. The compound of claim 1 which is benzyl-sulphonic acid-(4-methyl-Δ³-piperideide).

11. The compound of claim 1 which is 3,4-dimethoxy-cinnamic acid-(4-methyl-Δ³-piperideide).

12. The compound of claim 1 which is p-acetoxy-phenylacetic acid-(4-methyl-Δ³-piperideide).

13. The compound of claim 1 which is p-hydroxy-phenylacetic acid-(4-methyl-Δ³-piperideide).

14. The compound of claim 1 which is m-hydroxy-phenylacetic acid-(4-methyl-Δ³-piperideide).

15. The compound of claim 1 which is o-methoxy-phenylacetic acid-(4-methyl-Δ³-piperideide).

16. The compound of claim 1 which is p-methoxy-phenylacetic acid-(4-methyl-Δ³-piperideide).

17. A compound of the formula:

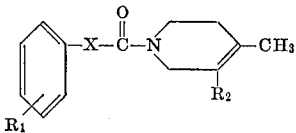

wherein
X is a direct bond or

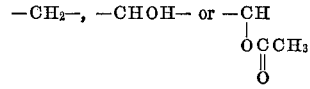

R₁ is hydrogen or one or two unsubstituted hydroxyl, methoxy or acetoxy groups, and
R₂ is hydrogen or methyl.

References Cited

UNITED STATES PATENTS 3,030,372    4/1962    Janssen _____ 260—297

HENRY R. JILES, Primary Examiner

G. T. TODD, Assistant Examiner

U.S. Cl. X.R.

260—294.8, 295, 297; 424—256